March 3, 1931. B. S. DIXON 1,794,884
HYDRAULIC CLUTCH
Filed Nov. 26, 1928 2 Sheets-Sheet 1
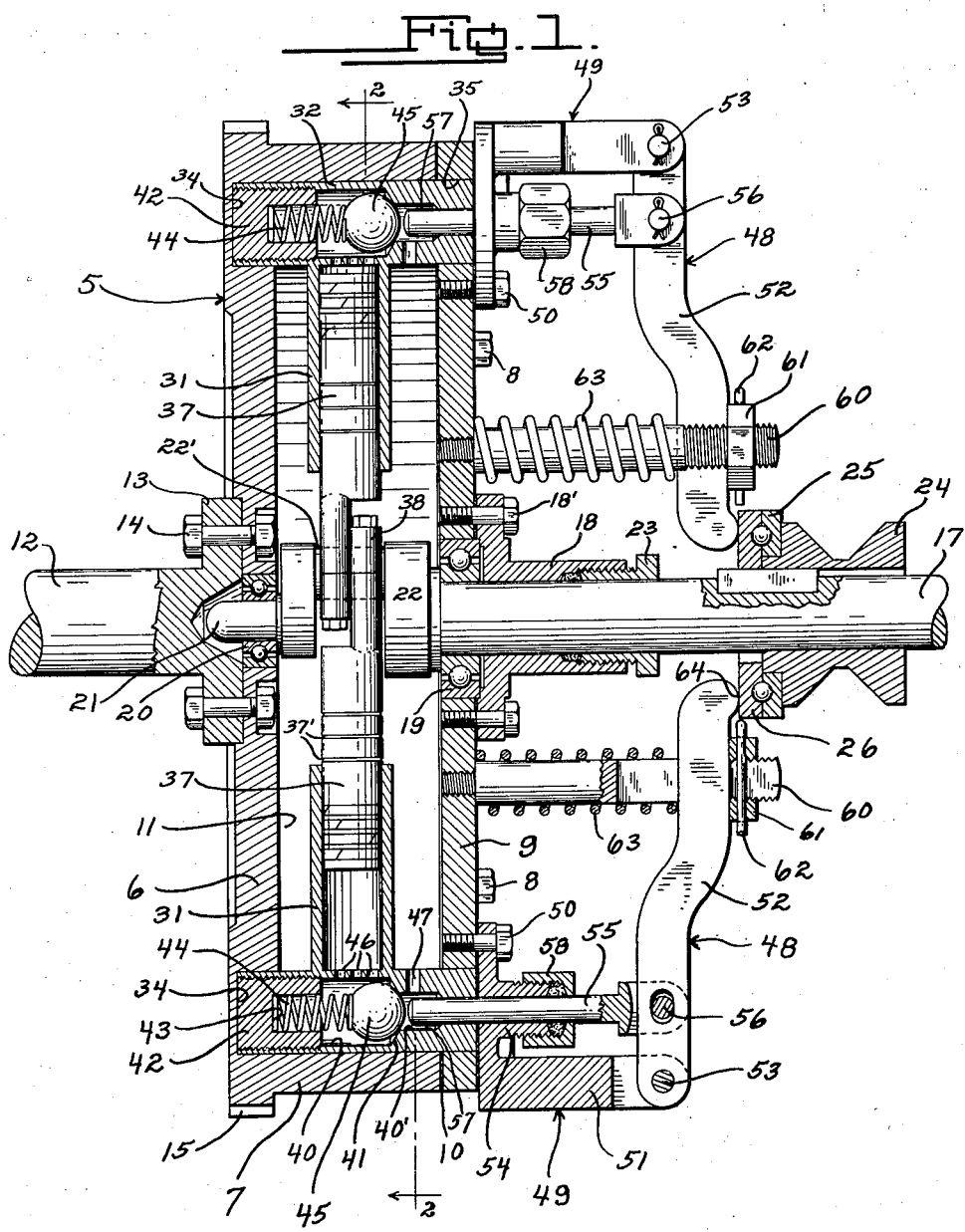
INVENTOR.
Bedford S. Dixon, Deceased,
By Bessie I. Dixon, Adm'x.
BY
ATTORNEYS.

March 3, 1931.  B. S. DIXON  1,794,884
HYDRAULIC CLUTCH
Filed Nov. 26, 1928  2 Sheets-Sheet 2
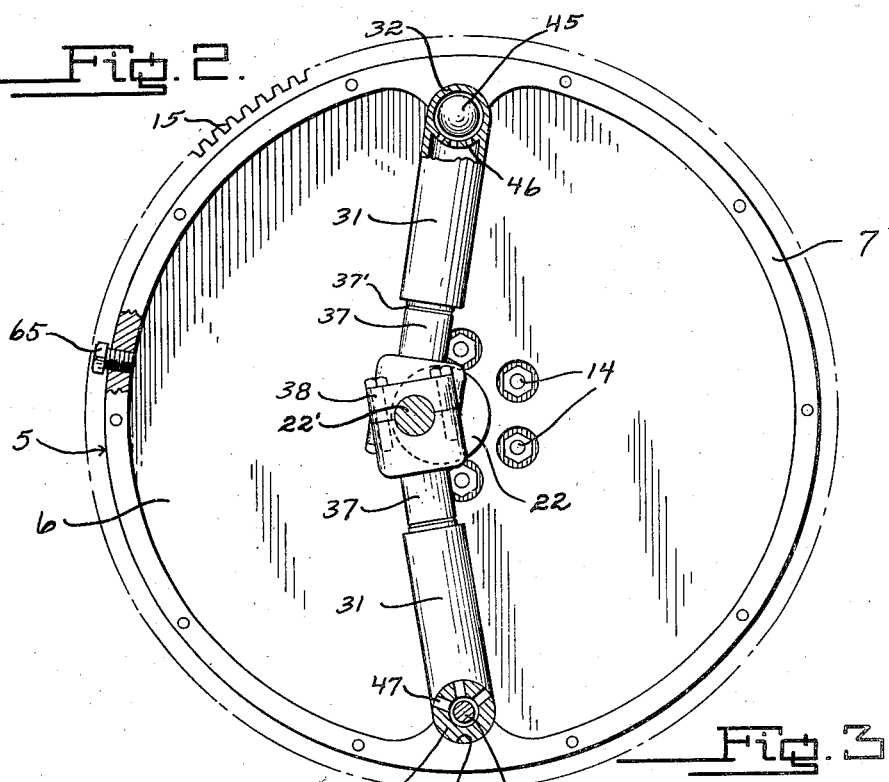
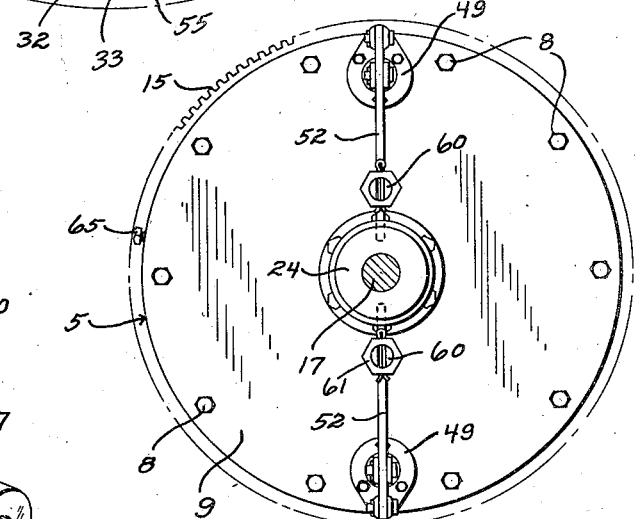
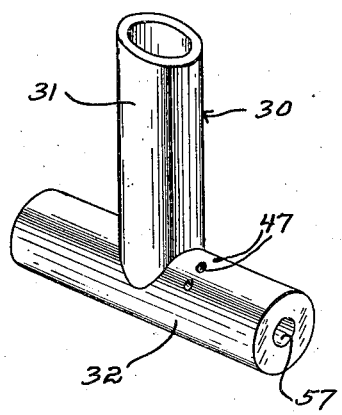
INVENTOR.
Bedford S. Dixon, Deceased
By Bessie I. Dixon, Adm'x.
BY
ATTORNEYS.

Patented Mar. 3, 1931

1,794,884

UNITED STATES PATENT OFFICE

BEDFORD S. DIXON, DECEASED, LATE OF WEST BADEN, INDIANA, BY BESSIE I. DIXON, ADMINISTRATRIX, OF WEST BADEN, INDIANA, ASSIGNOR OF ONE-THIRD TO ARTHUR DIXON AND ONE-THIRD TO EDDIE A. PALMER, BOTH OF WEST BADEN, INDIANA

HYDRAULIC CLUTCH

Application filed November 26, 1928. Serial No. 321,990.

The present invention relates to clutch mechanisms primarily intended for use upon motor vehicles, and the primary object of the invention is to provide an improved clutch device which is devoid of frictional contacting elements which require frequent adjustments due to wear and the employment of relatively stiff spring devices for maintaining the clutch elements in clutching relation.

A further object of the invention is to provide a fluid operated clutch device wherein continuous power from a drive shaft may be gradually imparted to a driven shaft until the driven shaft is rotating at a speed equal to that of the drive shaft.

A further object of the invention is to provide a hydraulic clutch embodying a novel arrangement of cylinders and cooperating pistons for forming a driving connection between the drive and driven shafts.

A still further object of the invention is to provide a fluid operating clutch device which is extremely simple in operation, and one which may be constructed to serve as the fly wheel of an internal combustion engine for motor driven vehicles.

Other objects and advantages of the invention will be apparent during the course of the following detailed description, taken in connection with the accompanying drawings forming a part of this specification and in which drawings:

Figure 1 is a central section thru the clutch.

Figure 2 is a section on a reduced scale on line 2—2 of Figure 1.

Figure 3 is a face plan view of the rear side of the clutch on a still further reduced scale.

Figure 4 is a perspective view of one of the cylinder forming members.

Referring to the drawings in detail, and wherein similar reference characters designate corresponding parts thruout the several views, the numeral 5 designates a cylindrical casing including a disc-like rear wall 6 provided with an integral annular wall 7 to the rear edge of which is secured as by bolts 8, a disc-like cover plate 9. A suitable gasket 10 is interposed between the cover plate 9 and rear edge of the annular wall 7 for providing a leak proof chamber 11 for receiving a non-compressible fluid such as oil or the like. The casing 5 is preferably formed from metal and is intended to act as a fly wheel for the drive or crank shaft 12 of the vehicle motor. The drive shaft 12 is flanged in the usual manner as at 13 and this flange is bolted as by bolts 14 to the rear side of the casing wall 6 at the axial center thereof. The retaining nuts for the bolts 14 are preferably recessed into the inner side of the casing wall 6 as clearly illustrated in Figures 1 and 2 to reduce the overall thickness of the casing. The casing 5 may be provided at the periphery of the rear wall 6 with the usual gear teeth 15 to be engaged by the starter mechanism for the motor.

Journaled axially in the casing 5 is a clutch or driven shaft 17 which extends thru a suitable collar 18 which is bolted to the cover plate 9 by suitable cap bolts 18'. The cover plate 9 inwardly of the collar 18 carries a roller bearing 19 for the shaft 17, while the forward extremity of the shaft 17 is supported in a roller bearing 20 carried by the rear casing wall 6. The dead end 21 of the shaft 17 preferably projects into a pocket provided in the end of the drive shaft 12. The shaft 17, within the chamber 11 of the casing 5 is provided with a crank 22 offset axially from the axis of the shaft 17. A packing gland 23 is threaded into the outer end of the collar 18 for preventing leakage of the oil thru the shaft collar.

Keyed for longitudinal movement on the shaft 17 rearwardly of the collar 18 is a clutch sheave 24 which carries at its forward side a roller thrust bearing 25 including a bearing ring portion 26 which is rotatable independently of the sheave 24. Any suitable clutch collar may be coupled to the clutch sheave 24 for movement of the sheave longitudinally along the shaft 17.

Mounted at diametrically opposite locations within the cylindrical casing 5 is a pair of identically formed T-shaped members 30 each including a tubular stem portion 31 and a cylindrical head portion 32. These T-shaped members 30 form a portion of the drive connection between the driving casing 5 and the shaft 17. The annular or circumferential wall 7 of the casing is provided at diametrically opposite points with arcuate shaped bearing seats 33 in which the cylindrical head portions 32 have seating engagement, and the rear casing wall 6 is provided with circular pockets 34 which align with the channel-like bearing seats 33 for receiving the rear ends of the head portions 32. The cover plate 9 is provided with circular shaped openings 35 which form bearings for the rear ends of the heads 32, and the rear ends of the heads preferably extend flush with the rear face of the cover plate as clearly shown in Figure 1. Thus it will be seen that the pockets 34 and openings 35 serve to retain the cylindrical head portions 32 seated in the bearings 33 with the tubular stem portions 31 projecting inwardly toward the axis of the casing 5. The tubular stem portions 31 of the T-shaped drive members 30 form cylinders being open at their inner ends for slidably receiving pistons 37 which are connected by suitable caps 38 to the crank pin 22' of the crank 22. Thus it will be seen that upon rotation of the crank 22 that the pistons 37 will be moved into and out of the cylinder forming stems 31 at opposite sides of the axis of rotation of the shaft 17. The pistons 37 may be provided with suitable piston rings and are provided with oil grooves 37' which are movable into and out of the cylinders for oiling the pistons so that the same will have free sliding movement in the cylinders 31.

The cylindrical head portion 32 of each member 30 is provided with a chamber forming bore 40 which opens at the forward end of the head portion and is reduced in diameter adjacent the rear end of the head as at 40' to provide a valve seat 41. Threaded into the rear end of the larger bore portion 40 is a combined closure and reinforcing plug 42 which is recessed at its inner side as at 43 to form a pocket for receiving an expansion coil spring 44, acting upon a ball valve 45 for normally maintaining the valve in a closed position upon the seat 41. Forming communication between the interior of the cylinder 31 and the ball valve chamber is a suitable number of openings 46, while forming communication between the reduced bore portion 40' and the chamber 11 externally of the cylinder 31 is a suitable number of combined inlet and outlet ports 47. By observing Figure 1 it will be seen that when the ball valves 45 are seated that the valves will act to control the passage of fluid from the cylinder chambers to the casing chamber 11 thru the ports 47.

The drive members 30 are each provided with a fluid control means 48 which act upon the ball valves 45 for controlling the passage of fluid between the cylinder chambers and the chamber 11. The fluid control means each includes a mounting bracket 49 which is secured to the cover plate 9 by stud bolts 50 which pass thru the flanges of the brackets and are threaded into the cover plate. The brackets 49 are provided with hanger arms 51 which extend parallel with the axis of the casing 5 and have bifurcated outer ends for pivotal mounting of release arms or levers 52 pivotally connected to the hangers by removable pivot pins 53. The brackets 49 are provided inwardly of the arms 51 with tubular guide portions 54 which align axially with the cylindrical drive member heads 32, and these guide portions 54 slidably receive therethru release pins 55 which are pivotally connected at their outer ends as by a removable pivot pin 56 to the release levers 52. The inner ends of the release pins 55 project into the reduced bore portions 40' thru suitable guide openings 57 provided axially in the rear portions of the head portions 32. A packing nut 58 is threaded upon the outer end of each guide portion 54 for preventing leakage of fluid outwardly thru the guide opening for the valve release pin.

The release levers 52 extend radially inwardly from their pivotal connections 53 and have their inner ends extending thru longitudinally slotted guide pins 60 which are threaded into the cover plate 9 in diametrical alignment with the mounting brackets 49. Each guide pin 60 is externally threaded at its outer end for receiving a lever adjusting nut 61, and each nut is provided with a cotter pin 62 adapted to extend thru the guide slot for the release levers for retaining the nut in an adjusted position on the guide pin. An expansion coil spring 63 encircles each guide pin 60 between the cover disc 9 and the respective release lever and acts to normally urge the lever away from the cover disc into engagement with the adjusting nut 61. This normal position of the release levers 52 acts to normally retain the inner ends of the release pins 55 out of engagement with the ball valves 45 so that the ball valves are normally maintained seated upon the seats 41 by the springs 44. The inner end of each release lever is provided with a rounded head portion 64 which engages the inner face of the bearing ring 26 so that upon longitudinal movement of the clutch sheave 24 along the shaft 17, the levers will be swung toward the casing 5 about their pivotal connections 53.

In operation of the clutch, the chamber 11 is filled about half full of oil thru the filler plug 65, and which oil aside from forming a driving medium between the casing 5 and shaft 17 also acts to retain the parts in a thoroughly lubricated condition. Upon movement of the clutch sheave 24 longitudinally along the shaft 17 toward the casing 5, the levers 52 will be swung inwardly about the pivot pins 53 and cause the release pins 55 to engage and unseat the ball valves 45 so that the oil will have free passage thru the ports 46 and 47 between the cylinder chambers and the chamber 11. With the ball valves unseated the pistons 37 will have free sliding movement in the cylinders 31 for allowing the driving casing 5 to revolve freely about the shaft 17. Upon releasing pressure on the clutch sheave 24, the springs 63 will move the inner ends of the levers 52 away from the casing and withdraw the release pins 55 to allow the ball valves 45 to seat upon the seats 41 for shutting off communication between the cylinder chambers and the casing chamber 11. When the ball valves 45 are seated the oil in one of the cylinder chambers will be compressed and retain the cylinders 31 in angular relation as shown in Figure 2 for causing the shaft 17 to be rotated with the casing 5. Thru gradual closing of the ball valves 45 the clutch shaft 17 will be gradually rotated thru the retarded movement of the pistons 37 by allowing the oil to gradually escape from the cylinder chambers into the casing chamber 11.

By so having the inner ends of the release levers 52 act upon the bearing ring 26 of the thrust bearing 25, all wear upon the inner ends of the levers will be eliminated since the bearing ring will revolve with the casing 5 when the clutch is in its released position.

While but two of the T drive members and cooperating pistons have been shown and described as forming the driving means between the casing 5 and the clutch or driven shaft 17, it will readily be apparent that any desired number of these drive elements may be mounted within the casing and be controlled by additional control means 48 provided for each of the drive elements.

From the foregoing description it will be apparent that a novel and improved construction for hydraulic clutches has been provided which is extremely simple and durable in operation, and one which may be readily substituted for existing types of clutch mechanisms such as employed upon motor vehicles. It will also be apparent that a novel construction for the drive means between the driving casing and clutch shaft has been provided wherein the cylinders are oscillatively mounted for eliminating the necessity of providing connecting rods between the piston and crank pin.

Changes in detail may be made to the form of invention herein shown and described, without departing from the spirit of the invention or the scope of the following claims.

What is claimed is:

1. In a hydraulic clutch, a hollow rotatable casing providing a fluid receiving chamber, a clutch shaft rotatably journaled in the casing and including a crank arranged in said chamber, a cylinder including a cylindrical head portion pivotally mounted in the casing at the peripheral portion thereof, said cylinder having ports forming communication between the cylinder chamber and fluid chamber thru said hollow cylinder head, a piston rod slidably fitting in the cylinder and connected to the crank, a ball valve in the cylinder head for closing communication thru said ports, means normally maintaining said valve closed, a valve release pin extending into the cylinder head concentric to the pivotal axis thereof, and a lever connected with the outer end of the release pin for imparting longitudinal movement thereto.

2. In a hydraulic clutch, a hollow rotatable casing providing a fluid receiving chamber, a clutch shaft rotatably journaled in the casing and including a crank arranged in said chamber, a T-shaped drive member including a tubular cylinder forming stem and a cylindrical head portion rotatably mounted in the casing, said drive member having ports forming communication between the cylinder chamber and said fluid chamber, a ball valve arranged in the head portion of the drive member for closing communication to said ports, means for normally maintaining said valve closed, a piston rod slidably fitting in the cylinder and connected to said crank, a valve release pin slidably extending into the cylindrical head portion of the drive member co-axial with the pivotal axis thereof, a lever connected to the release pin for actuation thereof, means for normally maintaining the valve release pin retracted, and means enagageable with the free end of said lever for urging the release pin to a position for unseating said valve.

3. In a hydraulic clutch, a hollow rotatable casing providing a fluid receiving chamber, a clutch shaft journaled in the casing and including a crank arranged in said chamber, a cylinder including a hollow cylindrical head portion oscillatively mounted in the casing and having ports forming communication between the cylinder chamber and said fluid chamber, a piston rod slidably fitting in the cylinder and connected to the crank, a ball valve arranged in the hollow cylinder head for normally closing communication thru said ports, a bracket mounted exteriorly of the casing, a pin slidable in said bracket and projecting into the hollow cylinder head for unseating said valve, a lever pivotally carried by the bracket for actuating said pin, means for normally retaining said pin in a retracted position, and a sheave slidably mounted on said clutch shaft and engageable with said lever for imparting movement thereto.

4. A hydraulic clutch comprising a hollow cylindrical casing providing a fluid receiving chamber, an arcuate bearing seat formed inwardly of the circumferential wall of the casing and extending throughout the width of the wall, a shaft rotatably journaled axially of the casing and including a crank arranged in said chamber, a drive member including a tubular cylinder forming stem and a hollow cylindrical head portion bearing engagement throughout the length of said seat, ports provided in the hollow head portion forming communication between the cylinder chamber and said fluid chamber, a piston slidably fitting in the cylinder and connected to the crank, valve means in the hollow head portion for normally closing communication between the cylinder and fluid chambers, a release pin slidable axially in one end of the head portion for unseating said valve, and means for imparting movement to said pin.

5. A hydraulic clutch comprising a hollow casing providing a fluid receiving chamber, a clutch shaft journaled in the casing and including a crank arranged in said chamber, cylinders oscillatively mounted at their outer ends in the casing and having ports forming communication between the cylinder chambers and the fluid chamber, a piston slidably fitting in each cylinder and connected to the crank, normally seated valve means for closing the ports of each cylinder, a longitudinally movable releasing pin for each valve means, levers for imparting movement to the pins, guide means for each lever, spring means for said levers for retaining the valve releasing pins in a retracted position, and means engageable with said levers for imparting movement thereto for unseating the valve means.

6. A hydraulic clutch comprising a hollow casing providing a fluid receiving chamber, a shaft journaled in the casing and including a crank portion arranged in said chamber, a cylinder including a hollow head portion oscillatively mounted in the casing and having ports forming communication between the cylinder chamber and said fluid chamber, a piston slidably fitting in the cylinder and connected to the crank, a ball valve in the hollow cylinder head for normally closing said ports, a bracket mounted exteriorly of the casing at one end of the cylinder heads, a stem slidable in the bracket and projecting into the hollow head portion for unseating said valve, a lever pivotally carried by the bracket and connected to the outer end of the stem for imparting longitudinal movement thereto, a slotted guide pin through which said lever extends, means on the pin for limiting outward movement of the lever, spring means normally urging the lever outwardly, and a sheave slidable on said shaft and engageable with the inner end of the lever for imparting movement thereto for unseating said valve.

7. In a hydraulic clutch, a hollow rotatable casing providing a fluid receiving chamber, a clutch shaft journaled axially in the casing and including a crank arranged in said chamber, a cylinder oscillatively mounted at its end in the casing radially of said shaft and having ports forming communication between the cylinder chamber and said fluid chamber, a piston slidably fitting in the cylinder and connected to the crank, a valve for normally closing communication thru said ports, a longitudinally movable stem for unseating said valve, a lever pivotally connected adjacent the outer edge of the casing and extending inwardly toward said clutch shaft, means connecting the outer end of said stem to the lever, a slotted guide pin carried by the casing and through which said lever extends, a stop adjustable on the guide pin for limiting outward movement of the lever, a spring encircling the guide pin for normally urging the lever into engagement with the stop, a sheave keyed for longitudinal movement on the clutch shaft, and a roller thrust bearing carried by the forward end of the sheave and including a bearing ring engageable by the inner end of said lever.

8. In a hydraulic clutch, a hollow cylindrical casing providing a fluid receiving chamber, an arcuate bearing seat formed inwardly of the circumferential wall of the casing, a shaft journaled axially of the casing and including a crank arranged in said chamber, a drive member including a tubular stem and a hollow cylindrical head portion for seating engagement in said arcuate seat, communicating passageways between the stem and hollow head, said hollow head having a chamber communicating port and a valve seat between the port and passageways between the stem and head, a ball valve in the head, means normally seating the ball valve, a piston slidably fitting in the stem and connected to said crank, a release pin for unseating the ball valve to permit fluid communication between the stem and casing chamber, and means for imparting movement to the stem.

9. In a hydraulic clutch, a hollow cylindrical driving casing providing a fluid receiving chamber, an arcuate bearing seat formed inwardly of the circumferential wall of the casing, a shaft journaled axially in the casing and including a crank arranged in said chamber, a T-shaped drive member including a tubular cylinder forming stem and a hollow cylindrical head portion for bearing engagement in said seat, a plug threaded into and closing one end of the hollow head, said cylinder having communication with the hollow head and said hollow head having communication with the casing chamber, a valve seat in the hollow head, a ball valve for engaging upon said seat, an expansion spring acting between said plug and ball valve for normally seating the valve and closing communication between the cylinder and said chamber, a piston slidably fitting in the cylinder and connected to said crank, and means for unseating said ball valve.

BESSIE I. DIXON,
*Administratrix of the Estate of Bedford S. Dixon, Deceased.*